(12) United States Patent
Kuwabara et al.

(10) Patent No.: US 11,535,336 B2
(45) Date of Patent: Dec. 27, 2022

(54) SADDLE RIDING VEHICLE

(71) Applicants: HONDA MOTOR CO., LTD., Tokyo (JP); ÖHLINS RACING AB, Upplands Väsby (SE)

(72) Inventors: Naoki Kuwabara, Tokyo (JP); Yuta Ishizaka, Tokyo (JP); Björn Bylund, Upplands Väsby (SE)

(73) Assignees: Honda Motor Co., Ltd., Tokyo (JP); Ohlins Racing AB, Upplands Vasby (SE)

( * ) Notice: Subject to any disclaimer, the term of this patent is extended or adjusted under 35 U.S.C. 154(b) by 288 days.

(21) Appl. No.: 16/908,972

(22) Filed: Jun. 23, 2020

(65) Prior Publication Data
US 2020/0407008 A1 Dec. 31, 2020

(30) Foreign Application Priority Data
Jun. 27, 2019 (JP) .............................. JP2019-120404

(51) Int. Cl.
*B62K 25/28* (2006.01)
*F16F 13/00* (2006.01)
*B62K 25/04* (2006.01)

(52) U.S. Cl.
CPC .......... *B62K 25/283* (2013.01); *F16F 13/007* (2013.01); *B62K 2025/044* (2013.01)

(58) Field of Classification Search
CPC ............ B62K 25/283; B62K 2025/044; B62K 2025/045; B62K 2025/048; F16F 13/007; F16F 9/44
See application file for complete search history.

(56) References Cited

U.S. PATENT DOCUMENTS 4,273,220 A * 6/1981 Tilkens ................ B62K 25/283
 188/289
4,311,302 A * 1/1982 Heyer ..................... F16F 9/096
 188/322.22

(Continued)

FOREIGN PATENT DOCUMENTS

EP 1816063 A2 8/2007
JP 2003-232396 A 8/2003

(Continued)

OTHER PUBLICATIONS

Japanese Office Action dated Jun. 29, 2021, with English translation, 7 pages.

(Continued)

*Primary Examiner* — Darlene P Condra
(74) *Attorney, Agent, or Firm* — Rankin, Hill & Clark LLP

(57) ABSTRACT

A saddle riding vehicle includes a swing arm in which front ends of arm sections and supporting a wheel are supported by a pivot shaft, and an electronic control suspension that is provided between the pivot shaft and the arm sections, that has a portion overlapping with the swing arm in side view of the vehicle and that includes a control valve section at an upper portion thereof. In the saddle riding vehicle, the control valve section is disposed on one lateral side in regard of the vehicle width direction of the upper portion of the suspension, and extends toward a vehicle width-directionally outer side from a side surface of the upper portion.

3 Claims, 5 Drawing Sheets

(56) References Cited

U.S. PATENT DOCUMENTS

| | | | | |
|---|---|---|---|---|
| 4,732,244 A | * | 3/1988 | Verkuylen | F16F 9/446 |
| | | | | 188/315 |
| 6,105,740 A | * | 8/2000 | Marzocchi | F16F 9/443 |
| | | | | 188/298 |
| 2011/0017559 A1 | | 1/2011 | Sintorn | |
| 2018/0304957 A1 | | 10/2018 | Kobayashi et al. | |

FOREIGN PATENT DOCUMENTS

| | | |
|---|---|---|
| JP | 2007-223572 A | 9/2007 |
| JP | 2009-132222 | 6/2009 |
| JP | 2019-100411 A | 6/2019 |
| WO | 2008/097183 A1 | 8/2008 |

OTHER PUBLICATIONS

German Office Action dated Feb. 4, 2022, Application No. 102020116737.7, w/English translation, 8 pages.
Japanese Office Action dated Jan. 25, 2022, Application No. 2019120404, w/English translation, 5 pages.

\* cited by examiner

SADDLE RIDING VEHICLE

CROSS-REFERENCE TO RELATED APPLICATION

The present application claims priority under 35 U.S.C. § 119 to Japanese Patent Application No. 2019-120404 filed on Jun. 27, 2019, the entire contents of which are hereby incorporated by reference.

TECHNICAL FIELD

The present invention relates to a saddle riding vehicle.

BACKGROUND ART

Hitherto, in saddle riding vehicles, one in which a suspension unit is provided between a vehicle body and a swing arm has been known. The suspension unit includes a cushion unit in which a spring and a damper are provided integrally, the cushion unit is provided between the vehicle body and the swing arm, and is disposed such as to overlap with a pair of left and right arms of the swing arm in side view of the vehicle. Since the swing arm is swung vertically relative to the vehicle body, the swing arm is provided with a space secured for permitting movement while avoiding interference with the cushion unit.

In addition, an electronically controlled suspension unit in which the characteristics of the suspension are controlled electronically is provided with a reserve tank and an electronically controlled valve as functional sections at an upper portion of the cushion unit. Therefore, in the swing arm using the electronically controlled suspension unit, a space for permitting movement of the functional sections is secured in addition to the space for permitting movement of the cushion unit (see, for example, Patent Document 1).

PRIOR ART DOCUMENT

Patent Document

[Patent Document 1]
Japanese Patent Laid-open No. 2009-132222

SUMMARY OF THE INVENTION

Problem to be Solved by the Invention

Incidentally, the swing arm is a member for supporting a wheel, and it is necessary to secure rigidity of the swing arm. However, in the case where the rigidity of the swing arm is secured while providing a space for the suspension unit as aforementioned, a space for the electronically controlled valve is provided inside the swing arm. Therefore, the swing arm is enlarged in size toward vehicle width-directionally outer sides and the rear side. In addition, in the case where a change in the outer shape of the swing arm is suppressed, it is necessary to provide a reinforcement in the inside of the swing arm, so that the inside structure of the swing arm is complicated.

The present invention has been made in consideration of the above-mentioned circumstances. It is an object of the present invention to ensure that an electronically controlled valve provided in a rear suspension is not liable to influence the shape or weight of a swing arm, in a saddle riding vehicle including an electronically controlled suspension.

Means for Solving the Problem

A saddle riding vehicle includes a swing arm (13) that supports a wheel (3), a pivot shaft (22) that supports the swing arm (13) on a vehicle body in a swingable manner, and a suspension (24) that is arranged between the vehicle body and the swing arm (13), the swing arm (13) including a pair of left and right arm sections (13L, 13R) and a cross section (13a) that interconnects the left and right arm sections (13L, 13R) in a left-right direction, front ends of the arm sections (13L, 13R) being supported on the pivot shaft (22), a space (13s) permitting the suspension (24) to be vertically passed therethrough being provided between the pivot shaft (22) and the cross section (13a), the suspension (24) including a part that overlaps with the swing arm (13) in side view of the vehicle, and a control valve section (24s) controlled electronically being provided at an upper portion (24a) of the suspension (24), in which the control valve section (24s) is disposed on one lateral side in regard of a vehicle width direction of the upper portion (24a) of the suspension (24), and extends toward an outer side in regard of the vehicle width direction from a side surface of the upper portion (24a).

In the above configuration, the control valve section (24s) may include substantially cylindrical control valves (24b, 24c), and centers of the control valves (24b, 24c) may be located on a front side relative to a center line (L4) of the suspension (24).

In addition, in the above configuration, the two control valves (24b, 24c) may be aligned on front and rear sides in side view of the vehicle, and the control valve (24c) on the front side may be located below the control valve (24b) on the rear side.

Besides, in the above configuration, the suspension (24) may include a pressure tank (24d), the pressure tank (24d) may be substantially cylindrical and be disposed on the rear side of the upper portion (24a) of the suspension (24), and a center line (L2) of the pressure tank (24d) may be provided so as to be directed rearwardly upward in side view of the vehicle.

In addition, in the above configuration, the two control valves (24b, 24c) may be disposed between an extension line (L5) of an upper edge of the pressure tank (24d) and an extension line (L6) of a lower edge of the pressure tank (24d) in side view of the vehicle.

Besides, in the above configuration, an inclination (L1) of an upper edge of the swing arm (13) between the pivot shaft (22) and the cross section (13a), an inclination of the center line (L2) of the pressure tank (24d), and an inclination of a straight line (L3) passing through the centers of the two control valves (24b, 24c) may be substantially parallel in side view of the vehicle.

Effects of the Invention

The saddle riding vehicle includes the swing arm that supports the wheel, the pivot shaft that supports the swing arm on the vehicle body in a swingable manner, and the suspension that is arranged between the vehicle body and the swing arm, the swing arm including the pair of left and right arm sections and the cross section that interconnects the left and right arm sections in the left-right direction, the front ends of the arm sections being supported on the pivot shaft, the space permitting the suspension to be vertically passed therethrough being provided between the pivot shaft and the cross section, the suspension including the part that overlaps with the swing arm in side view of the vehicle, and the control valve section controlled electronically being provided at an upper portion of the suspension, in which the control valve section is disposed on one lateral side in regard of the vehicle width direction of the upper portion of the suspension, and extends toward the outer side in regard of the vehicle width direction from the side surface of the upper portion.

According to this configuration, a gap can be provided between the control valve section of the suspension and the swing arm, the control valve section can be disposed at such a position as to permit swinging of the swing arm, and the influence of the control valve section on the swinging amount of the swing arm can be reduced. In addition, the influence of the control valve section on the size of that space in the swing arm through which the suspension is passed can be reduced. Further, enlargement of the swing arm in size due to the disposition of the control valve section is easily avoided.

In the above configuration, the control valve section may include substantially cylindrical control valves, and the centers of the control valves may be located on the front side relative to the center line of the suspension.

According to this configuration, the control valve section is disposed near the front side of the suspension, and it is easy to secure a space on the rear side of the suspension. In addition, since the swing arm is large in moving amount on the rear side, it is easy to secure a gap between the control valve section disposed near the front side of the suspension and an upper surface of the swing arm.

In addition, in the above configuration, the control valves may be aligned on the front and rear sides in side view of the vehicle, and the control valve on the front side may be located below the control valve on the rear side.

According to this configuration, the control valves can be disposed at such positions as to little influence the swinging direction of the swing arm.

Besides, in the above configuration, the suspension may include the pressure tank, the pressure tank may be substantially cylindrical and be disposed on the rear side of the upper portion of the suspension, and the center line of the pressure tank may be provided so as to be directed rearwardly upward in side view of the vehicle.

According to this configuration, the pressure tank of the suspension can be disposed at such a position as to be not liable to influence the movement of the swing arm.

In addition, in the above configuration, the two control valves may be disposed between the extension line of the upper edge of the pressure tank and the extension line of the lower edge of the pressure tank in side view of the vehicle.

According to this configuration, the control valve section and the pressure tank projecting from the suspension are disposed in the manner of being accommodated within a predetermined width, whereby the suspension inclusive of the control valve section and the pressure tank can easily be put into a compact shape, so that a space can easily be secured between the suspension and the vehicle body.

Besides, in the above configuration, the inclination of the upper edge of the swing arm between the pivot shaft and the cross section, the inclination of the center line of the pressure tank, and the inclination of a straight line passing through the centers of the two control valves may be substantially parallel in side view of the vehicle.

According to this configuration, the suspension can be disposed at such a position as to permit swinging of the swing arm, and gaps can easily be secured between the swing arm and the pressure tank and between the swing arm and the two control valves.

MODE FOR CARRYING OUT THE INVENTION

Figure 1:
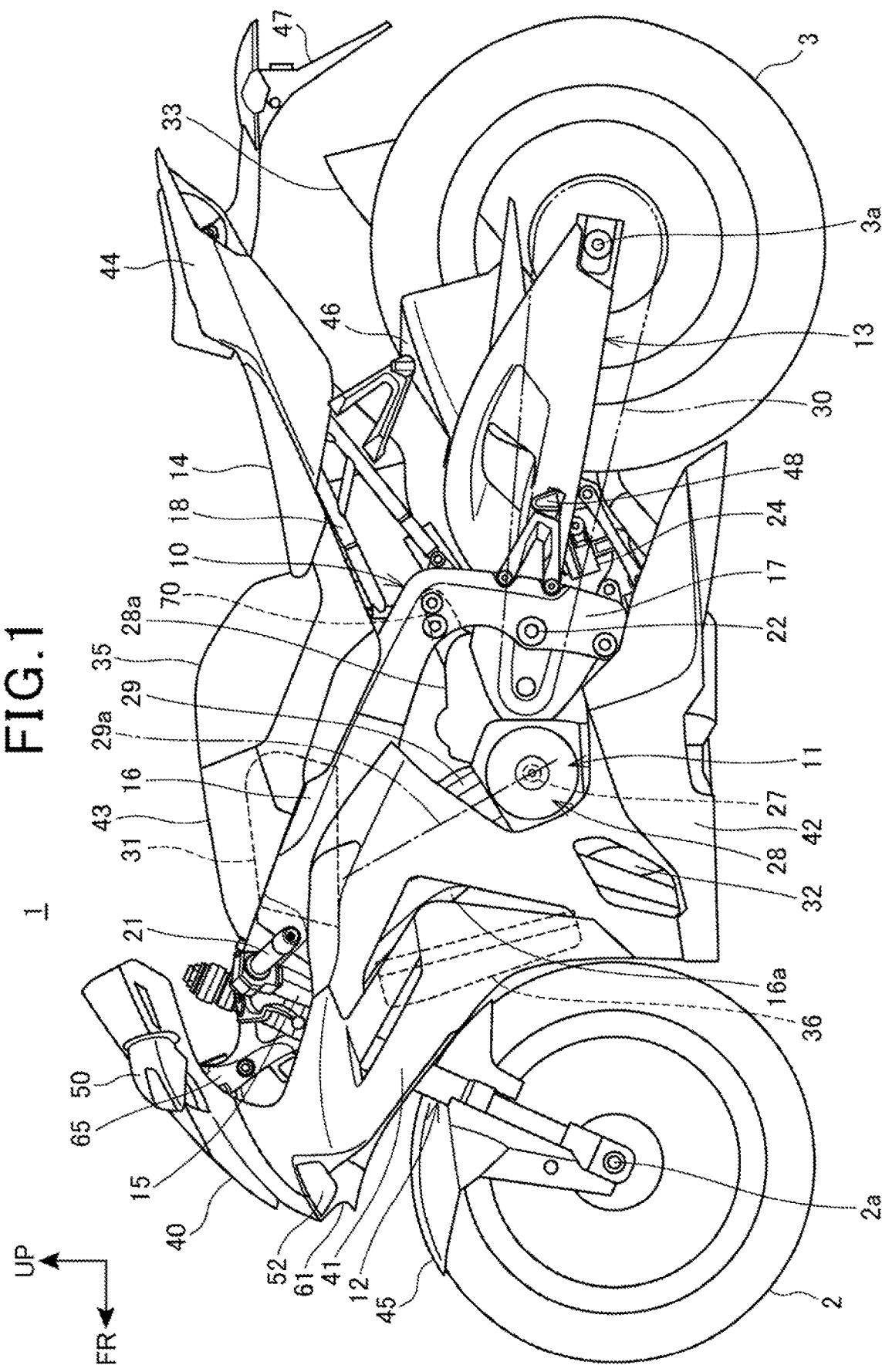
FIG. 1 is a left side view of a two-wheeled motor vehicle.

A saddle riding vehicle will be described below, referring to the drawings. Note that in the following description, the descriptions of directions such as forward, rearward, leftward, rightward, upward, and downward directions are the same as the directions in relation to a vehicle body, unless specified otherwise. In addition, a symbol FR in each drawing indicates the vehicle body front side, a symbol UP indicates the vehicle body upper side, and a symbol RH indicates the vehicle body right side.

FIG. 1 is a left side view of a two-wheeled motor vehicle 1.

The two-wheeled motor vehicle 1 is a vehicle in which an engine 11 as a power unit is supported on a body frame 10, a front fork 12 supporting a front wheel 2 is supported on a front end of the body frame 10 in a steerable manner, and a swing arm 13 supporting a rear wheel 3 is provided at a rear portion of the body frame 10.

The two-wheeled motor vehicle 1 is a saddle riding vehicle in which the rider is seated astride a seat 14, and the seat 14 is provided on an upper side of a rear portion of the body frame 10.

Figure 2:
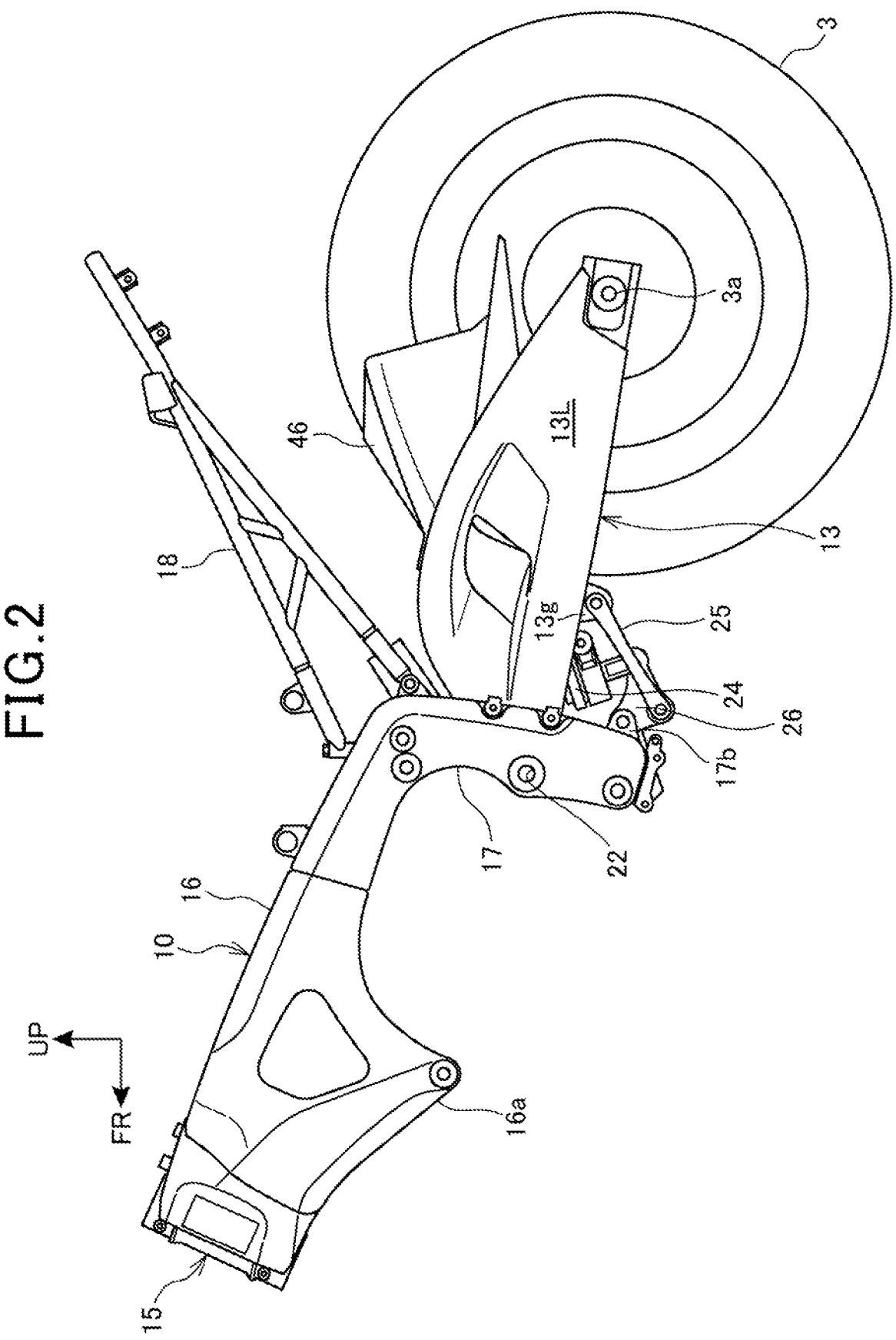
FIG. 2 is a left side view of a body frame, a swing arm and a rear wheel.

FIG. 2 is a left side view of the body frame 10, the swing arm 13 and the rear wheel 3.

The body frame 10 will be described referring to FIGS. 1 and 2. The body frame 10 includes a head pipe 15 provided at a front end of the body frame 10, and a pair of left and right main frames 16 extending rearwardly upward from the head pipe 15. Further, the body frame 10 includes a pair of left and right pivot frames 17 extending downward from rear ends of the main frames 16, and a pair of left and right seat frames 18 extending rearwardly upward from upper portions of the pivot frames 17.

The main frames 16 include engine hanger sections 16a that extend downward from front portions of the main frames 16 and support the engine 11.

The front fork 12 is shaft-supported by the head pipe 15 in the manner of being steerable to the left and right sides. A steering handlebar 21 is provided at an upper end portion of the front fork 12. The front wheel 2 is shaft-supported by an axle 2a provided at a lower end portion of the front fork 12.

The swing arm 13 is shaft-supported by a pivot shaft 22 supported by the left and right pivot frames 17. The pivot shaft 22 extends horizontally in the vehicle width direction. The swing arm 13 has a front end portion shaft-supported by the pivot shaft 22, and is swung upward and downward with the pivot shaft 22 as a center.

The rear wheel 3 is shaft-supported by an axle 3a provided at a rear end portion of the swing arm 13.

A rear suspension 24 is arranged between the vehicle body and the swing arm 13. As a mounting system for the rear suspension 24, a link system is used in which a link is connected to a lower portion of the rear suspension 24. As a result, variation in the posture of the rear suspension 24 relative to the vehicle body is reduced.

An upper end of the rear suspension 24 is connected to the vehicle body. An upper end portion 24a of the rear suspension 24 is connected to the engine 11 as the vehicle body, through a cushion support section 70 that extends rearward from an upper rear end portion of a crankcase 28. Note that while an upper end of the rear suspension 24 is connected to the engine 11 serving as the vehicle body in the present embodiment, but this is not limitative. For example, the upper end of the rear suspension 24 may be connected to the body frame serving as the vehicle body.

A lower end of the rear suspension 24 is connected to the swing arm 13 and lower end portions of the pivot frames 17, through a link member 26 and link rods 25.

The engine 11 is disposed on the front side of the pivot frames 17 under the main frames 16, and is fixed to the body frame 10.

The engine 11 includes the crankcase 28 supporting a crankshaft 27 extending horizontally in the vehicle width direction (left-right direction), and a cylinder section 29 extending forwardly upward from a front portion of the crankcase 28. In the cylinder section 29 is accommodated a piston (not illustrated) that is reciprocated in the cylinder section 29. A cylinder axis 29a of the cylinder section 29 is inclined forward in relation to the vertical.

A rear portion of the crankcase 28 is a transmission case section that accommodates a transmission (not illustrated). An output power of the engine 11 is transmitted to the rear wheel 3 through a drive chain 30 that connects an output shaft of the transmission and the rear wheel 3.

An air cleaner box 31 is disposed on a rear upper side of the cylinder section 29. The air cleaner box 31 is connected to an intake port at a rear surface of the cylinder section 29 through a throttle body (not illustrated).

An exhaust pipe 32 of the engine 11 is drawn out downward from an exhaust port at a front surface of the cylinder section 29, and extends rearward by passing through the lower side of the engine 11. A rear end of the exhaust pipe 32 is connected to a muffler 33 disposed at a lateral side of the rear wheel 3.

A fuel tank 35 is disposed between the seat 14 and the air cleaner box 31, on an upper side of the main frames 16.

A radiator 36 of the engine 11 is disposed on the front side of the engine 11.

The two-wheeled motor vehicle 1 includes, as a body cover for covering the vehicle body such as the body frame 10 and the engine 11, a front cowl 40 covering an upper portion of the front fork 12 and the head pipe 15 from the front side, and a front side cover 41 covering a front portion of the vehicle body from lateral sides. Further, an under cover 42 covering the engine 11 from the lower side, a tank cover 43 covering the air cleaner box 31 and part of the fuel tank 35, and a rear cover 44 covering a rear portion of the vehicle body are provided as body cover.

A front fender 45 covering the front wheel 2 from an upper side is mounted on the front fork 12.

An inner fender 46 covering a front portion of the rear wheel 3 from an upper side is mounted on the swing arm 13.

A rear fender 47 covering a rear portion of the rear wheel 3 from an upper side extends rearwardly downward from rear end portions of the seat frames 18.

Steps 48 on which the rider on the seat 14 place the rider's feet are supported by the pivot frames 17 and are disposed on the rear side of the pivot frames 17.

Next, the swing arm 13, the rear suspension 24 and the rear wheel 3 will be described referring to FIGS. 3 to 5.

Figure 3:
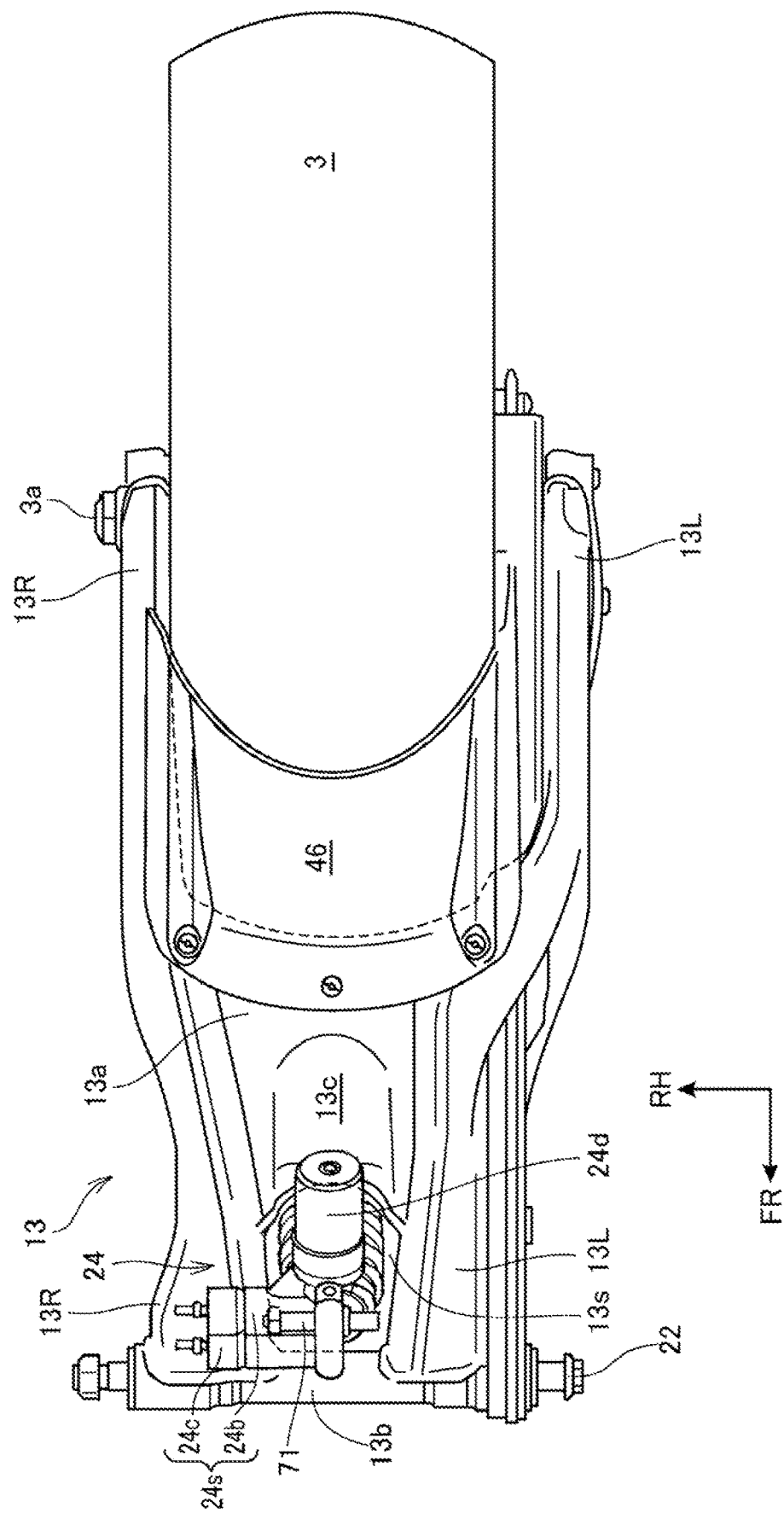
FIG. 3 is a plan view of the swing arm, a rear suspension and the rear wheel.
Figure 4:
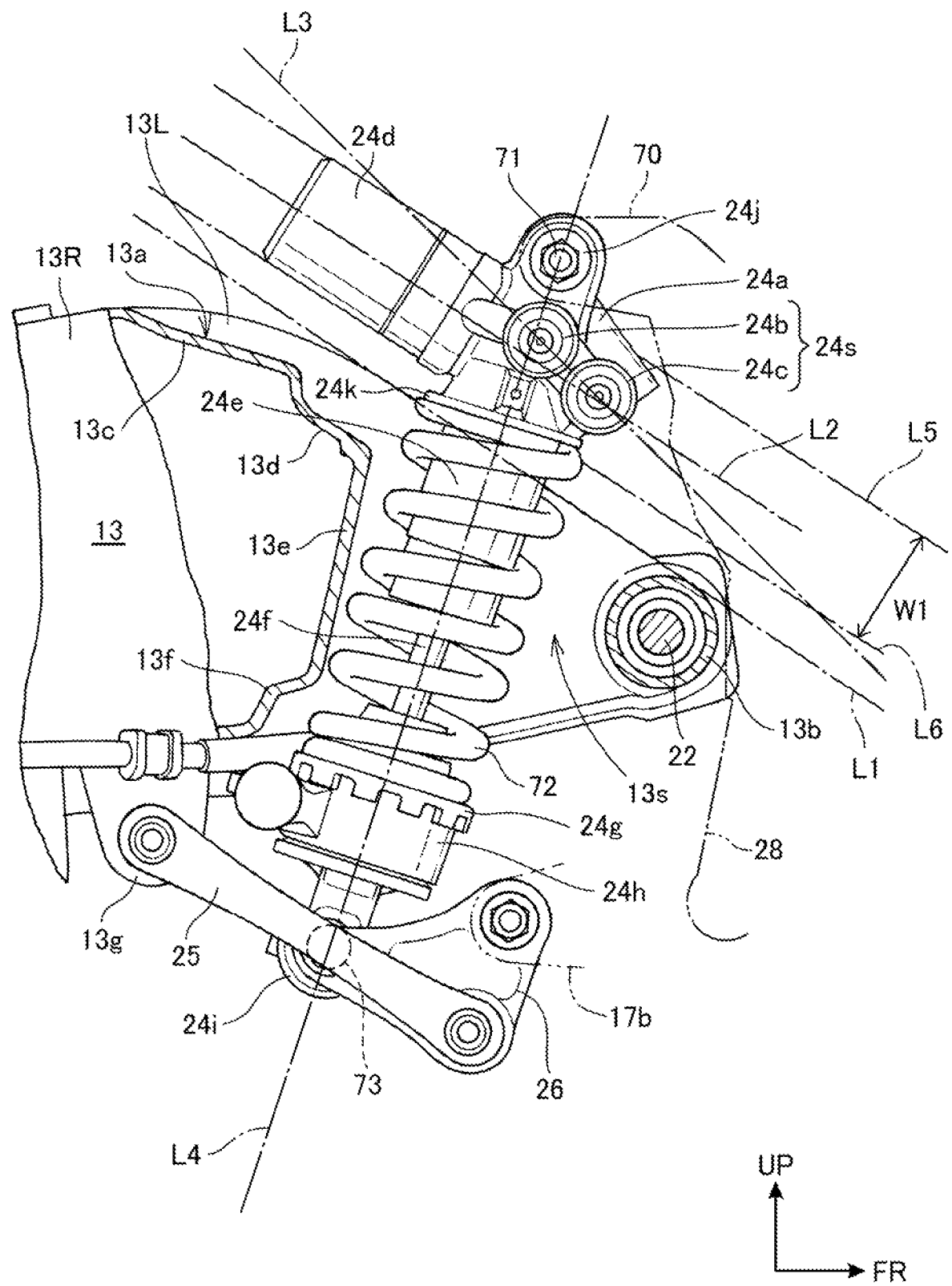
FIG. 4 is a partly broken right side view of the rear suspension and the swing arm.
Figure 5:
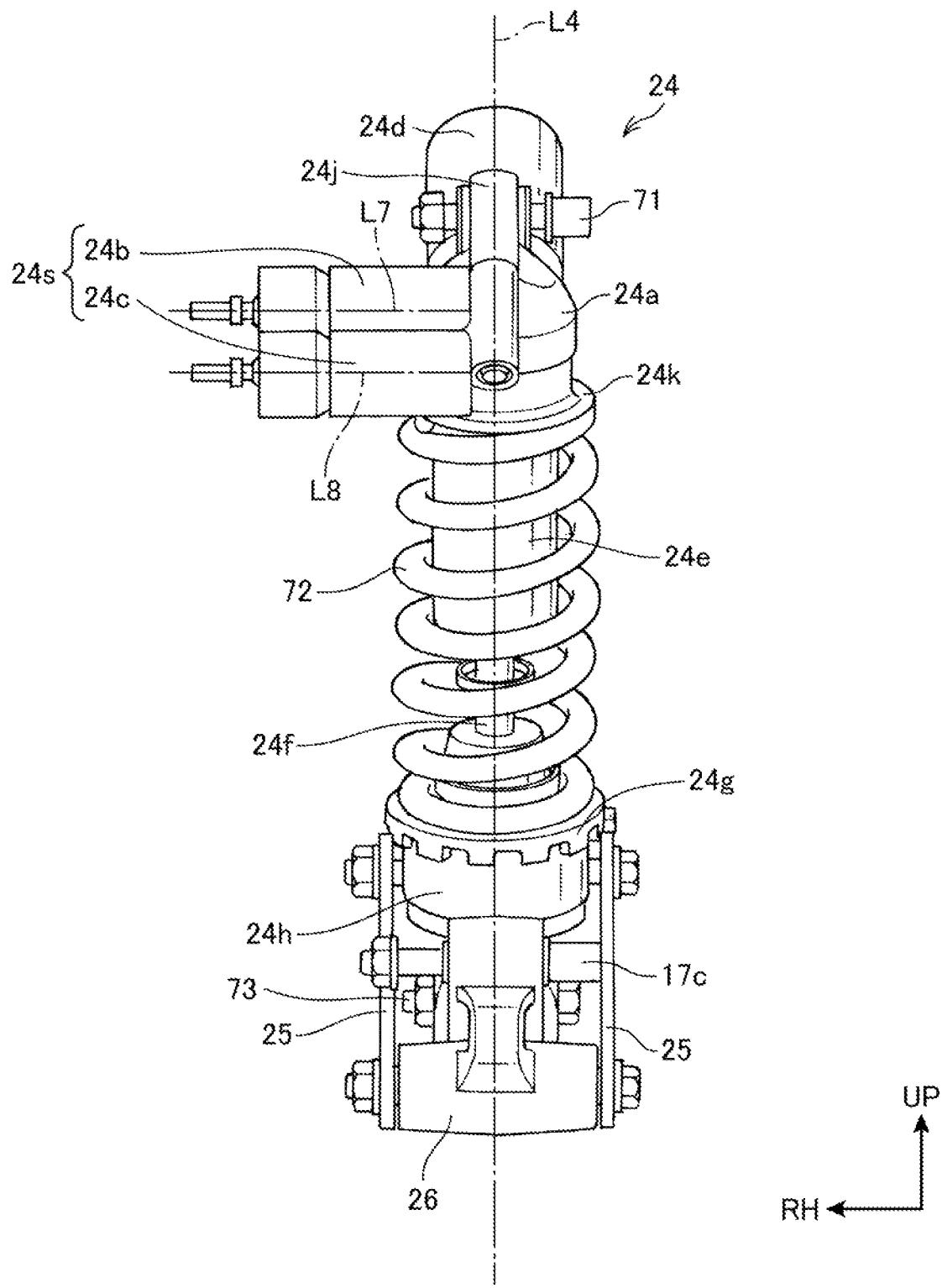
FIG. 5 is a front view of the rear suspension.

FIG. 3 is a plan view depicting the swing arm 13, the rear suspension 24 and the rear wheel 3, FIG. 4 is a partly broken right side view depicting the rear suspension 24 and the swing arm 13, and FIG. 5 is a front view of the rear suspension 24.

The swing arm 13 includes a pivot section 13b which is a front end portion of the swing arm 13, and a left arm section 13L and a right arm section 13R which are connected respectively to left and right rear portions of the pivot section 13b and extend toward the vehicle body rear side. The left arm section 13L and the right arm section 13R are connected by a cross section 13a on the rear side of the pivot section 13b. The pivot section 13b extends in the vehicle body left-right direction, and the pivot shaft 22 fitted with a bearing is inserted in the pivot section 13b. As a result, the swing arm 13 is supported on the body frame 10 in the manner of being rotatable in upward and downward directions.

The left arm section 13L and the right arm section 13R extend in the longitudinal vehicle direction, and front end portions of the left arm section 13L and the right arm section 13R are connected to each other by the pivot section 13b. On the rear side of the pivot section 13b, intermediate portions of the left arm section 13L and the right arm section 13R are connected by the cross section 13a. As a result, a space 13s in which to dispose the rear suspension 24 is formed between a front portion of the left arm section 13L and a front portion of the right arm section 13R and between the pivot section 13b and the cross section 13a.

The left arm section 13L and the right arm section 13R each have an upper surface in an upwardly protuberant arcuate shape and a bottom surface in a substantially horizontal shape. The cross section 13a is connected to the left arm section 13L and the right arm section 13R at those portions of the left arm section 13L and the right arm section 13R which are large in width in the vehicle body vertical direction. The cross section 13a is substantially tetragonal in sectional shape in side view of the vehicle body, and vehicle body left-right directional end portions of the cross section 13a are connected to the left arm section 13L and the right arm section 13R.

The rear wheel 3 as a driving wheel is disposed on the rear side of the cross section 13a. The interval in the vehicle body left-right direction between the left arm section 13L and the right arm section 13R is larger on the rear side of the cross section 13a than on the front side of the cross section 13a. The rear wheel 3 is mounted on rear end portions of the left arm section 13L and the right arm section 13R through the axle 3a. Besides, a rear surface portion of the cross section 13a is shaped along an outer shape of a tire of the rear wheel 3.

Note that the inner fender 46 covering the front portion of the rear wheel 3 is mounted on an upper surface of the swing arm 13, on the rear side relative to the cross section 13a and those portions of the left arm section 13L and the right arm section 13R which are connected to the cross section 13a.

A downwardly recessed recess 13c is provided in an upper surface front portion of the cross section 13a, and the recess 13c is provided in conformity with the position of a pressure tank 24d of the rear suspension 24, which will be described later, in plan view of the vehicle. A recess 13d downwardly recessed by one step from the recess 13c is provided on the front side of the recess 13c. A wall section 13e inclined forward in side view of the vehicle is connected to a front end of the recess 13d, and the wall section 13e constitutes a front surface of the cross section 13a. An upwardly recessed recess 13f is connected to a lower end of the wall section 13e. A rod mounting section 13g is provided at a lower surface of the cross section 13a, on the rear side of the wall section 13e.

The recess 13c, the recess 13d and the recess 13f are provided at a front portion of the cross section 13a, and the wall section 13e is short in vertical length. The wall section 13e is configured in a rearwardly protuberant arcuate shape in plan view of the vehicle.

The rear suspension 24 is disposed in the space 13s provided in the swing arm 13 in such a posture that the rear suspension 24 is inclined forward. Since the swing arm 13 is configured in the aforementioned shape, a space can be secured between the rear suspension 24 and the swing arm 13, and a large swinging amount of the swing arm 13 can be secured.

The rear suspension 24 is formed in a tubular shape, is compressed in its axial direction attendant on vertical swinging of the swing arm 13, and absorbs a shock from the road surface by stroking in the axial direction.

The rear suspension 24 is disposed in such a posture that a center axis of the stroke of the rear suspension 24 is inclined forward in relation to the vertical.

The rear suspension 24 includes an upper end portion 24a disposed on an upper side of the swing arm 13, a lower end portion 24h disposed on a lower side of the swing arm 13, and a spring 72 compressed between the upper end portion 24a and the lower end portion 24h. Note that the lower end portion 24h is required only to have at least part thereof located below the swing arm 13, and an upper part of the lower end portion 24h may overlap with the swing arm 13 in side view of the vehicle.

In addition, the rear suspension 24 includes a cylinder section 24e extending downward from the upper end portion 24a, a piston rod 24f extending upward from the lower end portion 24h and connected to the cylinder section 24e, and a piston valve (not illustrated) provided at an end portion of the piston rod 24f and located inside the cylinder section 24e. Note that an axis of the piston rod 24f is located on a center line L4 of the rear suspension 24.

The cylinder section 24e is filled with a working oil for attenuation. When the lower end portion 24h is stroked vertically, the piston valve is moved as one body with the lower end 24h, and is slid inside the cylinder section 24e in the center axis direction of the cylinder section 24e.

The spring 72 is a coil spring. The cylinder section 24e and the piston rod 24f are inserted in and passed through an inner periphery of the coil of the spring 72. In other words, the spring 72 is wound around the peripheries of the cylinder section 24e and the piston rod 24f.

A spring receiving section 24k for receiving an upper end of the spring 72 is provided at a lower surface of the upper end portion 24a. The spring receiving section 24k is an annular section larger in diameter than the cylinder section 24e.

An upper portion connection section 24j connected to the cushion support section 70 is provided at an upper end of the upper end portion 24a. The upper end portion 24a is connected to the cushion support section 70 on the vehicle body side by a connection shaft 71 inserted in and passed through the upper portion connection section 24j in the vehicle width direction.

A ring-shaped preload adjustor 24g for receiving a lower end of the spring 72 is provided at an upper portion of the lower end portion 24h.

The spring 72 is provided in a compressed state between the spring receiving section 24k of the upper end portion 24a and the preload adjustor 24g of the lower end portion 24h, and biases the lower end portion 24h in an extending direction of the rear suspension 24.

An initial load on the rear suspension 24 is adjusted by the preload adjustor which is movable in the axial direction of the rear suspension 24.

The initial load on the rear suspension 24 is a reaction force of the spring 72 compressed between the spring receiving section 24k and the preload adjustor 24g. The magnitude of the initial load corresponds to flexure (compression amount) of the spring 72 from a free length.

A lower portion connection section 24i connected to the link member 26 is provided at a lower end of the lower end portion 24h of the rear suspension 24. The lower portion connection section 24i is connected to the link member 26 by a connection shaft 73 which is inserted in and passed through the lower portion connection section 24i in the vehicle width direction.

The link member 26 is connected to the rear suspension 24 at its rear end portion, and is rotatably supported on mounting sections 17b of the pivot frames 17 at its front end portion. The link member 26 has a downwardly projecting triangular shape in side view of the vehicle, and front end portions of the link rods 25 are connected to left and right side surfaces of the lower end portion of the link member 26. Rear end portions of the link rods 25 are connected to the rod mounting section 13g of the swing arm 13.

The rear suspension 24 is a pressurization type suspension, and the pressure tank 24d is mounted on the upper end portion 24a of the rear suspension 24. The pressure tank 24d is filled therein with a pressurized gas, reserves a working oil for damping therein, and can be said to be a reserve tank.

The pressure tank 24d has a cylindrical shape with a rear end closed, and is connected to a rear part of the upper end portion 24a. A center line L2 of the cylinder of the pressure tank 24d is directed rearwardly upward relative to a connection part for connection with the upper end portion 24a.

In addition, the upper end portion 24a is provided with a control valve section 24s. The control valve section 24s includes a first control valve 24b and a second control valve 24c integral with each other. The first control valve 24b and the second control valve 24c are substantially cylindrical in shape, and extension/contraction characteristics of the rear suspension 24 are controlled by the first control valve 24b and the second control valve 24c. The first control valve 24b and the second control valve 24c each include a valve for changing constriction of an oil line, and an actuator for driving the valve. The first control valve 24b and the second control valve 24c are configured such that one of them performs a control on the extension side, while the other performs a control on the compression side.

The working oil in the cylinder section 24e can flow into and out of the pressure tank 24d through an oil line (not illustrated) in the upper end portion 24a. The first control valve 24b and the second control valve 24c are connected to the oil line in the upper end portion 24a. The flow of the working oil is adjusted by the first control valve 24b and the second control valve 24c, whereby the extension/contraction characteristics of the rear suspension 24 are controlled. Note that since the pressure tank 24d is connected directly to the upper end portion 24a, the oil line connected from the upper end portion 24a to the pressure tank 24d can be made short, resulting in a configuration in which response can easily be enhanced.

Besides, the rear suspension 24 is an electronically controlled suspension in which damper characteristics are controlled electronically, and the first control valve 24b and the second control valve 24c are connected to a controller (not illustrated) mounted on the two-wheeled motor vehicle 1. The damper characteristics of the rear suspension 24 may be automatically adjusted by the controller.

The upper end portion 24a has the first control valve 24b disposed on the front side, and the second control valve 24c is disposed on the rear side of the first control valve 24b. The first control valve 24b and the second control valve 24c are provided in the state of extending toward one side or the other side in the vehicle width direction. In the present embodiment, the first control valve 24b and the second control valve 24c are provided to extend toward the right side as compared to a right side part of the upper end portion 24a. In addition, as depicted in FIG. 5, a straight line L7 extending in the vehicle width direction while passing through the center of the first control valve 24b and a straight line L8 extending in the vehicle width direction while passing through the center of the second control valve 24c are parallel to each other. The straight line L8 is located below the straight line L7 in front view of the vehicle.

The first control valve 24b and the second control valve 24c are provided to extend to a vehicle width directionally outer side from the upper end portion 24a located substantially at the center of the vehicle width, and have parts overlapping with the right arm section 13R of the swing arm 13 in plan view of the vehicle. As depicted in FIG. 4, the first valve 24b and the second valve 24c are located between an upper edge of the swing arm 13 and the crankcase 28.

As aforementioned, the pressure tank 24d extends obliquely upward from the upper end portion 24a toward the rear side in side view of the vehicle. The first control valve 24b and the second control valve 24c are provided on one side in the vehicle width direction, and are extended vehicle width-directionally outward.

In the present embodiment, the pressure tank 24d is provided on a rear surface side of the upper end portion 24a, and the first control valve 24b and the second control valve 24c are provided on the right side of the upper end portion 24a. The pressure tank 24d, the first control valve 24b and the second control valve 24c are provided to extend in a direction substantially orthogonal to the extending/contracting direction of the rear suspension 24, and are provided at positions for permitting swinging of the swing arm 13.

In addition, the center of the first control valve 24b in side view of the vehicle is located on the front side as compared to the center line L4 of the rear suspension 24. The center line L4 of the rear suspension 24 passes through the piston rod 24f and coincides with the sliding direction of the piston rod 24f.

More specifically, the center of the first control valve 24b in side view of the vehicle is a center point of a bottom surface circle of a cylindrical shape, and the center of the first control valve 24b is located on the front side as compared to the center line L4 of the rear suspension 24.

The first control valve 24b and the second control valve 24c are aligned on the front and rear sides, and the second control valve 24c on the rear side is located below the first control valve 24b on the front side.

As illustrated in FIG. 4, a straight line L1 coinciding with the inclination of an upper surface of a front portion of the swing arm 13 is lowered forwardly. Here, the straight line L1 is a line along upper surfaces of front portions of the left arm section 13L and the right arm section 13R. Besides, in FIG. 4, a straight line L3 passing through the center of the first control valve 24b and the center of the second control valve 24c in side view of the vehicle is depicted. The straight line L1, the center line L2 of the pressure tank 24d, and the straight line L3 are substantially parallel. As a result, the pressure tank 24d, the first control valve 24b and the second control valve 24c are disposed at such positions as not to be liable to influence the swinging of the swing arm 13, even when the swing arm 13 is swung vertically with the pivot shaft 22 as a center.

In addition, the straight line L3 is inclined to be lowered more in the forward direction than the straight line L1 in side view of the vehicle. This ensures that even in the case where the swing arm 13 is largely swung upward, a space can easily be secured between an upper surface of the swing arm 13 and the control valve section 24s.

Besides, as illustrated in FIG. 4, the first control valve 24b and the second control valve 24c are disposed within the width W1 of the pressure tank 24d in side view of the vehicle. The first control valve 24b and the second control valve 24c are disposed between an extension line L5 of an upper edge of the pressure tank 24d and an extension line L6 of a lower edge of the pressure tank 24d in side view of the vehicle. Here, the width W1 is the width between the extension line L5 of the upper edge of the pressure tank 24d and the extension line 6 of the lower edge of the pressure tank 24d in side view of the vehicle.

Therefore, it is possible to provide a space between the pressure tank 24d and the swing arm 13, and to take a large spacing between the swing arm 13 and the first control valve 24b and the second control valve 24c.

An operation of the rear suspension 24 will be described.

When a load is exerted on the rear wheel 3 of the two-wheeled motor vehicle 1, the swing arm 13 is swung vertically with the pivot shaft 22 as a center. The rear suspension 24 has the upper portion connection section 24j connected to the cushion support section 70 on the vehicle body side, and has the lower portion connection section 24i connected to the mounting sections 17b on the vehicle body side through the link member 26. The position in the longitudinal vehicle direction of the lower portion connection section 24i of the rear suspension 24 is within a swinging range of a rear end portion of the link member 26, and variation of the posture of the rear suspension 24 relative to the vehicle body is restrained. Swinging of the swing arm 13 is transmitted to the rear suspension 24 through the link member 26 as a movement in an extending direction of the rear suspension 24. Then, the spring 72 is compressed, and the piston rod 24f is moved upward while being inserted in the cylinder section 24e.

When the swing arm 13 is swung upward, the distance between the upper surface of the swing arm 13 and the upper end portion 24a of the rear suspension 24 is reduced. However, the pressure tank 24d extends obliquely upward toward the rear side in relation to the vehicle body, and even in the case where the swing arm 13 is swung upward, a gap is secured between the swing arm 13 and the pressure tank 24d.

Besides, the control valve section 24s also extends obliquely upward toward the rear side in side view of the vehicle, so that a gap is secured between the control valve section 24s and the swing arm 13.

As has been described above, according to the present embodiment, the two-wheeled motor vehicle 1 as a saddle riding vehicle includes the swing arm 13 supporting the rear wheel 3 as a wheel, the pivot shaft 22 supporting the swing arm 13 in the manner of being swingable relative to the vehicle body, and the rear suspension 24 as a suspension arranged between the vehicle body and the swing arm 13. The swing arm 13 includes the left arm section 13L and the right arm section 13R as a pair of left and right arm sections, and the cross section 13a connecting the left arm section 13L and the right arm section 13R in the left-right direction. The front ends of the left arm section 13L and the right arm section 13R are supported by the pivot shaft 22, and the space 13s through which the rear suspension 24 is passed vertically is provided between the pivot shaft 22 and the cross section 13a. The rear suspension 24 includes a part overlapping with the swing arm 13 in side view of the vehicle. The control valve section 24s controlled electronically is provided at the upper end portion 24a which is an upper portion of the rear suspension 24. The control valve section 24s is disposed on one side in the vehicle width direction of the upper end portion 24a of the rear suspension 24, and extends vehicle width-directionally outward from a side surface of the upper end portion 24a.

According to this configuration, the piston rod 24f disposed inside the spring 72 of the rear suspension 24 and the cylinder section 24e are inserted in the space 13s permitting movements of the rear suspension 24, in the swing arm 13. The control valve section 24s is disposed avoiding the swing arm 13, and the shape of the space 13s is not liable to be influenced by the disposition of the control valve section 24s. As a result, it is easy to avoid enlargement of the space 13s in size. In addition, it is easy to avoid an increase in weight due to enlargement and reinforcement of the swing arm 13.

The control valve section 24s includes the first control valve 24b and the second control valve 24c which are substantially cylindrical in shape. The centers of the first control valve 24b and the second control valve 24c are located on the front side relative to the center line L4 of the rear suspension 24.

According to this configuration, the first control valve 24b and the second control valve 24c are disposed near the front side of the rear suspension 24, it is possible to provide a space between the first control valve 24b and the second control valve 24c of the rear suspension 24 and the swing arm 13, and the rear suspension 24 can be disposed at such a position as to permit swinging of the swing arm 13.

The first control valve 24b and the second control valve 24c are aligned on the front and rear sides in side view of the vehicle, and the second control valve 24c on the front side is located below the first control valve 24b on the rear side.

According to this configuration, the first control valve 24b and the second control valve 24c can be disposed at such positions as to little influence the swinging direction of the swing arm 13, a space can be provided between the first control valve 24b and the second control valve 24c and the swing arm 13, and the rear suspension 24 can be disposed at such a position as to permit swinging of the swing arm 13.

In addition, the rear suspension 24 includes the pressure tank 24d, the pressure tank 24d is substantially cylindrical in shape, and is disposed on the rear side of the upper end portion 24a of the rear suspension 24, and is provided in such a manner that the center line L2 of the pressure tank 24d is directed rearwardly upward.

According to this configuration, it is easy to dispose the pressure tank 24d avoiding the swing arm 13 which is swung, and it is easy to secure a gap between the swing arm 13 and the pressure tank 24d.

Besides, the first control valve 24b and the second control valve 24c are disposed between the extension line L5 of the upper edge of the pressure tank 24d and the extension line L6 of the lower edge of the pressure tank 24d in side view of the vehicle.

According to this configuration, the first control valve 24b and the second control valve 24c can be disposed, together with the pressure tank 24d, at such positions as to permit swinging of the swing arm 13.

Further, the inclination of the straight line L1 passing through the upper edge of the swing arm 13 between the pivot shaft 22 and the cross section 13a, the inclination of the center line L2 of the pressure tank 24d, and the inclination of the straight line L3 passing through the centers of the first control valve 24b and the second control valve 24c are substantially parallel.

According to this configuration, the swinging region of the swing arm 13 is not liable to be restricted by the rear suspension 24. In addition, a gap is easily provided between the swing arm 13 and the rear suspension 24, and the rear suspension 24 can be disposed at such a position as to permit swinging of the swing arm 13.

The aforementioned embodiment merely illustrates a mode of the present invention, and arbitrary modifications and applications are possible within such ranges as not to depart from the gist of the present invention.

While description has been made in the above embodiment by taking the two-wheeled motor vehicle 1 as an example of the saddle riding vehicle, this is not restrictive of the present invention. The present invention is applicable to three-wheeled saddle riding vehicles having two front wheels or two rear wheels, and to saddle riding vehicles having four or more wheels.

DESCRIPTION OF REFERENCE SYMBOLS

1 Two-wheeled motor vehicle (saddle riding vehicle)
3 Rear wheel (wheel)
13 Swing arm
13L Left arm section (arm section)
13R Right arm section (arm section)
13a Cross section
13s Space
22 Pivot shaft
24 Rear suspension (suspension)
24a Upper end portion (upper portion)
24b First control valve (control valve)
24c Second control valve (control valve)
24d Pressure tank
24s Control valve section
L1 Straight line (inclination of upper edge)
L2 Center line
L3 Straight line
L4 Center line
L5 Extension line
L6 Extension line

The invention claimed is:
1. A saddle riding vehicle including a swing arm that supports a wheel, a pivot shaft that supports the swing arm on a vehicle body in a swingable manner, and a suspension that is arranged between the vehicle body and the swing arm, the swing arm including a pair of left and right arm sections and a cross section that interconnects the left and right arm sections in a left-right direction, front ends of the arm sections being supported on the pivot shaft, a space through which the suspension vertically passes being provided between the pivot shaft and the cross section, the suspension including a part that overlaps with the swing arm in side view of a vehicle, and a control valve section controlled electronically being provided at an upper portion of the suspension, wherein the control valve section includes a first control valve and a second control valve, the first control valve and the second control valve are disposed on one lateral side in regard of a vehicle width direction of the upper portion of the suspension, and extends toward an outer side in regard of the vehicle width direction from a side surface of the upper portion, the first control valve and the second control valve are aligned on front and rear sides in side view of the vehicle, the second control valve on the front side is located below the first control valve on the rear side, the suspension includes a pressure tank, the pressure tank is substantially cylindrical and is disposed on a rear side of the upper portion of the suspension, a center line of the pressure tank is provided so as to be directed rearwardly upward in side view of the vehicle, and the first control valve and the second control valve are disposed between an extension line of an upper edge of the pressure tank and an extension line of a lower edge of the pressure tank in side view of the vehicle.

2. The saddle riding vehicle according to claim 1, wherein the first control valve and the second control valve are substantially cylindrical, and centers of the first control valve and the second control valve are located on a front side relative to a center line of the suspension.

3. The saddle riding vehicle according to claim 1, wherein an inclination of an upper edge of the swing arm between the pivot shaft and the cross section, an inclination of the center line of the pressure tank, and an inclination of a straight line passing through the centers of the first control valve and the second control valve are substantially parallel in side view of the vehicle.

* * * * *

UNITED STATES PATENT AND TRADEMARK OFFICE
CERTIFICATE OF CORRECTION

PATENT NO. : 11,535,336 B2  
APPLICATION NO. : 16/908972  
DATED : December 27, 2022  
INVENTOR(S) : Naoki Kuwabara et al.

Page 1 of 1

It is certified that error appears in the above-identified patent and that said Letters Patent is hereby corrected as shown below:

On the Title Page

Item (73) Assignees:
Change "Ohlins Racing AB, Upplands Vasby (SE)" to --Öhlins Racing AB, Upplands Väsby (SE)--.

Signed and Sealed this  
Ninth Day of January, 2024

Katherine Kelly Vidal  
*Director of the United States Patent and Trademark Office*